(No Model.)

A. VOELKLE.
DUMPING CART.

No. 497,934. Patented May 23, 1893.

Witnesses
R. Boeklen
Jakob Mayer

Inventor
Andreas Voelkle.

THE NORRIS PETERS CO., PHOTO-LITHO., WASHINGTON, D. C.

UNITED STATES PATENT OFFICE.

ANDREAS VOELKLE, OF NEW YORK, N. Y.

DUMPING-CART.

SPECIFICATION forming part of Letters Patent No. 497,934, dated May 23, 1893.

Application filed March 2, 1893. Serial No. 464,348. (No model.)

*To all whom it may concern:*

Be it known that I, ANDREAS VOELKLE, a citizen of the United States, and a resident of New York, in the county of New York and State of New York, have invented certain new and useful Improvements in Dumping Carts and Wagons, of which the following is a specification.

My invention has reference to dumping carts and wagons and the essential feature of it relates to the novel locking and releasing devices of the body from the shaft and the locking and unlocking and raising and dropping devices of the tail board from the body in a manner automatic and expeditiously and raising completely from the discharged load without unduly disturbing said load.

Said invention relates also to the peculiar construction of the cart cover doors with stops to hold the door raised in an upward position to protect against throwing loading material over past the cover opening in loading the cart.

Figure 1:
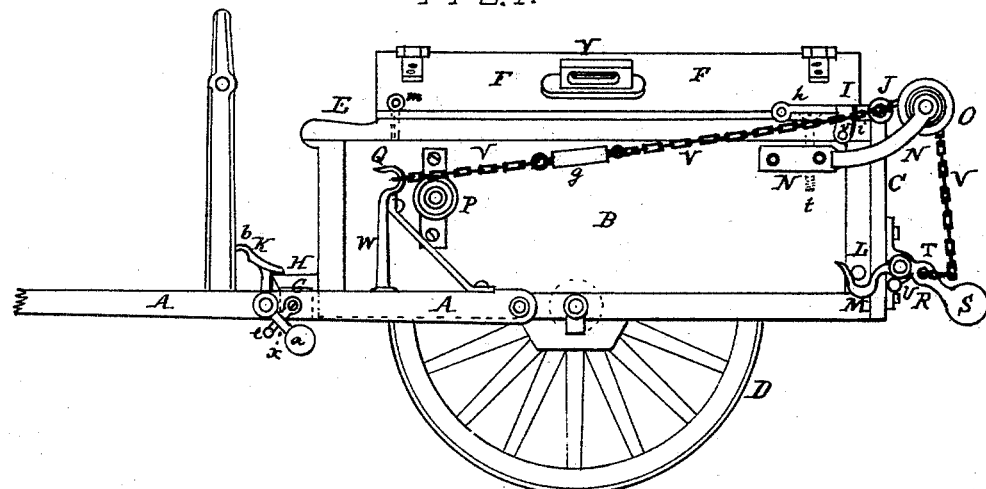
Figure 2:
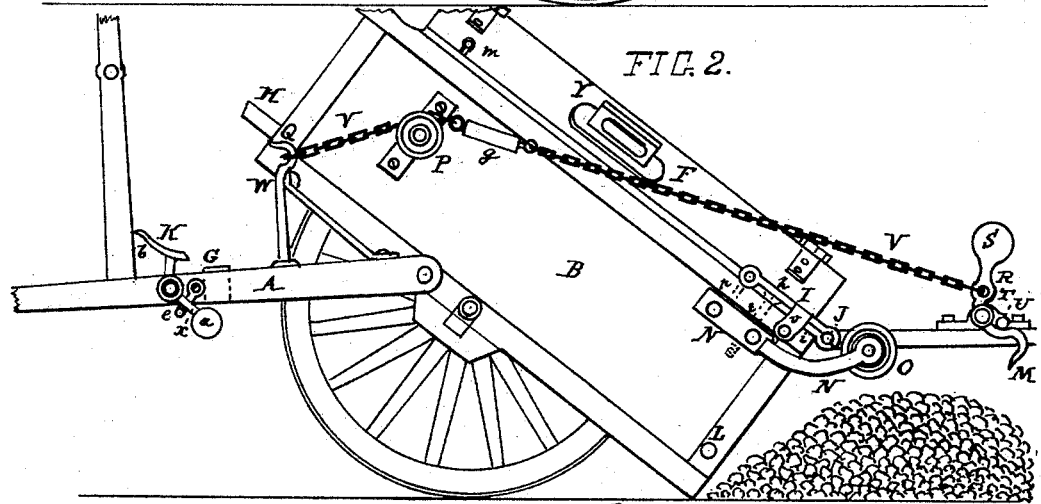
Figures 3, 4, 5, 6:
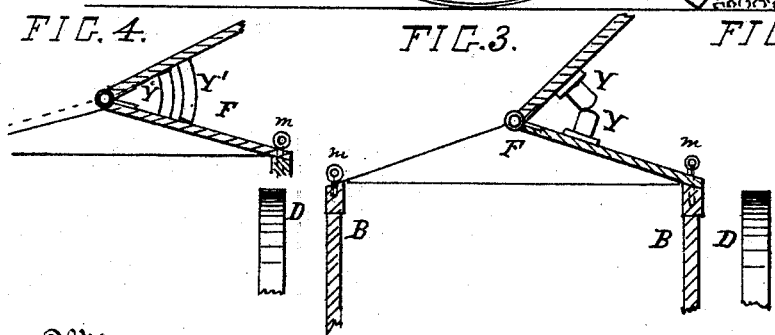

In the annexed drawings:—Figure 1. represents a side elevation of a cart with my improvement the wheel in front shown removed and the cart illustrated in position carrying the load. Fig. 2. is a similar view of the same but the cart shown in position of dumping the load. Fig. 3. is a lateral section of the cover or roof of the cart or wagon showing one side or door of the cover raised while loading the cart. Fig. 4. is a similar view of a modification of the same. Fig. 5. is a detached longitudinal section of one of the tail-board trunnion bearings. Fig. 6. is an end view of the same.

The letter of reference A indicates the tongues of the shaft of the cart, B the body, C its tailboard, D the wheels and E the driver's seat of the cart. F represents the cover or roof of the same. The tongues of the shaft are connected by the cross piece G upon which the projecting foot board H at the forward end of the cart body B rests, while in position for driving. The rear ends of the shaft are pivoted to the bottom rails of the body B, and on both or one of the tongues of the shaft is provided a vertical catch hook or pawl K pivoted to the respective tongue. Said pawl engages over the footboard H to lock it upon the crosspiece G and thereby holding the body B to the shaft A while the cart is being driven. Said pawl has a downward arm $x$ on the outside of the shaft with a balance weight $a$ and the top of it extends upward at $b$ to be unhooked by the driver's foot. Upon unhooking the pawl the rear end of the body B drops to the ground for dumping and the arm $z$ by the weight $a$ drops back and stops against a stud $e$ provided on the shaft A. The end of the foot board is made inclined so that when the body is brought home with the foot board upon the crosspiece G the pawl K yields to pass the footboard and the pawl locks over it by its weight $a$.

Upon the top rear ends of the sides of the body are secured the trunnion bearings I I in which the trunnions J J of the tail board C, are held and guided.

At one side of the body near its bottom rear end is provided a stud L and to engage with it is employed a pivoted tailboard hook M on the tailboard C for locking the tailboard to the body B, and on the same side of the body above the stud M is secured a strong arm N extending rearward and upward and pivoted to its rear end is a vertical pulley O and a secondary corresponding pulley P is provided and secured in line with it, at the forward part of the body as shown. Upon the tongue of the shaft on the same side of the body is furnished an upright post W with a strong brace and with an eye or hook Q in line with said pulleys. The tailboard hook M has a rearward arm R with a balance weight S and the eye T on said arm arranged in line with the pulley O. Said hook M turns upon a pivot which has a flat portion firmly bolted to the rear side of the tailboard, and said flat portion is provided with a stop or stud U to prevent the said hook from turning unduly far from the stud L.

A chain V is employed with its rear end secured to the eye T on the arm of the hook M, passing over the pulleys O and P, and its forward end is secured to the hook or eye Q on the post W. Said chain is furnished with a screw swivel $g$ for adjusting closely the length of the chain, so that in dropping the rear end of the body and thereby raising the body's forward end its pulley P on the forward end engages the chain V and it first turns the tailboard hook from engagement with the stud L and it thereafter engages with the stud U and causing the tail board to open and rise and by the time the body settles to the ground the tailboard has raised above the tail opening of the body, so that the body fully discharges the load and the cart can be moved off without risk of its tailboard disturbing the load discharged.

The body B is pivoted upon its wheels so as to overbalance with the driver's weight in his seat E the rear of the body and thereby causing the forward end of the body to drop home upon the cross piece G of the shaft, and that in dumping the body for discharge, the driver simply rises from his seat and steps upon the shaft, the rear part of the body overbalances the forward part and said rear part thereupon dumps to the ground as soon as released by the pawl K.

The trunnion bearings I are made of upper and lower half sections $h$ and $i$ shown in Figs. 2, 5, and 6, of which each has half of the bearing for the trunnion on the rear end and the forward ends are hinged together. The bottom section $i$ is secured upon the top rail of the body B with suitable screws or bolts $p\,t$ shown. The upper half section $h$ has a downward flat arm $v$ and the lower section has an eye $w$ meeting said arm which is perforated and a split pin $j$ is employed through said eye and the arm $u$ to hold the two sections together, for the bearing of the trunnion of the tailboard. By these means the bearings I I may be readily opened and the tailboard allowed with its trunnions to be entirely removed from the bearings in case the dumping of the load is required in places too narrow back of the cart for the tailboard in the raised condition to pass.

For carting street sweepings—the cart is covered by a board hip or roof cover F which consists of two longitudinal doors hinged together centrally and the loose end resting upon the ends and sides of the cart as shown in Figs. 3 and 4, the end sides of the cart terminating with gable ends for the roof or cover F. At the loose corner of each door is employed a vertical split pin $m$ which enters through a suitable hole in the door into the top sides of the cart by which means the doors are held upon the cart. Each door is furnished with one or more handles Y on its top solidly secured by which the door is raised for access in throwing the street sweepings into the cart and loading it, and either said handles are arranged to meet one upon the other as shown in Fig. 2, or special stops Y' are provided to meet the door or themselves as shown in Fig. 4, for the purpose of stopping the door when opened in a partly raised condition as shown so that by this means in loading the cart and throwing the sweepings into the cart the raised door serves as a guard to prevent the sweepings from being thrown past the door opening and thrown over to the other side of the cart and upon the sidewalk of the street.

For heavy carts it may be preferred to duplicate the locking, unlocking and raising devices for the body, tailboard and shaft and use a set of these devices to each side of the cart.

What I claim as my invention, and desire to secure by Letters Patent, is—

1. In dumping carts or wagons the combination and arrangement with the cart shaft, the cart body and tailboard, of the hook or eye Q, the chain V, the pulleys P and O, the tail board hook M and stud L substantially as and for the purpose herein set forth.

2. In dumping carts or wagons, the combination and arrangement with the cart shaft, the cart body and tailboard of the post W with the eye or hook Q the chain V with its swivel $g$ and the pulleys P and O and the tailboard hook M its stud U the arm R and weight S and the stud L and the trunnions J and bearings I and the pawl K substantially as and for the purpose herein set forth.

3. In dumping carts and wagons the combination with the cart shaft, body and tailboard and seat E, of the pawl K with its weight $a$ and stud $e$ and the foot board H, the post W its hook Q and the chain V and pulleys P and O and the tailboard M and stud L and the cover F with the doors and their handles and stops Y substantially as and for the purpose herein shown and described.

Signed at New York, in the county of New York and State of New York, this 28th day of February, A. D. 1893.

ANDREAS VOELKLE.

Witnesses:
R. BOEHLEN,
JAKOB MAYER.